(12) United States Patent
DuQuette

(10) Patent No.: US 11,562,663 B1
(45) Date of Patent: *Jan. 24, 2023

(54) PRODUCTION AND PRESENTATION OF AURAL CLOZE MATERIAL

(71) Applicant: John Nicholas DuQuette, New York, NY (US)

(72) Inventor: John Nicholas DuQuette, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,276

(22) Filed: Oct. 5, 2020

Related U.S. Application Data

(63) Continuation of application No. 16/423,100, filed on May 27, 2019, now Pat. No. 10,796,602.

(51) Int. Cl.
G09B 19/04 (2006.01)
G09B 7/04 (2006.01)
G09B 5/06 (2006.01)

(52) U.S. Cl.
CPC ............. *G09B 19/04* (2013.01); *G09B 5/065* (2013.01); *G09B 7/04* (2013.01)

(58) Field of Classification Search
CPC .......... G09B 19/04; G09B 5/065; G09B 7/04; G09B 7/00; G09B 5/00; G06F 16/958
See application file for complete search history.

(56) References Cited

U.S. PATENT DOCUMENTS

| | | | | |
|---|---|---|---|---|
| 5,010,495 A * | 4/1991 | Willetts | ................... | G09B 7/04 434/167 |
| 5,119,474 A * | 6/1992 | Beitel | .................. | G11B 27/034 |
| 5,274,758 A * | 12/1993 | Beitel | ..................... | G06F 16/40 |
| 5,885,083 A * | 3/1999 | Ferrell | ................... | G09B 5/065 434/156 |
| 6,341,959 B1 * | 1/2002 | Wen | ......................... | G09B 7/02 434/167 |
| 6,726,486 B2 * | 4/2004 | Budra | .................... | G09B 19/04 434/167 |
| 8,890,869 B2 * | 11/2014 | Duwenhorst | ......... | G06T 11/001 345/440.1 |
| 2003/0157467 A1 * | 8/2003 | Lundquist | ............. | G09B 19/08 434/157 |
| 2004/0078188 A1 * | 4/2004 | Gibbon | ............... | G06F 16/7844 704/1 |
| 2004/0199395 A1 * | 10/2004 | Schulz | ................. | G11B 27/031 704/278 |
| 2006/0292529 A1 * | 12/2006 | De Ley | .................. | G09B 19/04 434/362 |
| 2007/0209004 A1 * | 9/2007 | Layard | ..................... | G09B 5/00 707/E17.116 |
| 2007/0298385 A1 * | 12/2007 | Jenkins | .................. | G09B 19/06 434/156 |
| 2008/0070203 A1 * | 3/2008 | Franzblau | ............ | G09B 15/023 434/319 |

(Continued)

*Primary Examiner* — Malina D. Blaise

(74) *Attorney, Agent, or Firm* — Luis Figarella

(57) ABSTRACT

A machine-delivered aural cloze exercise makes use of natural, connected speech and allows for a portion of the audio to be selected and obfuscated during playback, creating an aural cloze portion. The aural cloze portion is extended beyond its natural length an effective amount to make the exercise clear to the user. If the audio is accompanied by video, the video is extended uniformly during the aural cloze portion, and optionally, can also be obfuscated during the aural cloze portion.

7 Claims, 15 Drawing Sheets

(56) References Cited

U.S. PATENT DOCUMENTS

| | | | |
|---|---|---|---|
| 2008/0195391 A1* | 8/2008 | Marple | G10L 13/06 704/260 |
| 2008/0235021 A1* | 9/2008 | Cross | G10L 15/19 704/257 |
| 2009/0048843 A1* | 2/2009 | Nitisaroj | G10L 15/1807 704/260 |
| 2010/0190145 A1* | 7/2010 | Singer | G09B 7/04 434/335 |
| 2010/0233661 A1* | 9/2010 | Franzblau | G09B 17/00 434/178 |
| 2011/0123967 A1* | 5/2011 | Perronnin | G09B 7/02 434/362 |
| 2011/0320198 A1* | 12/2011 | Threewits | G06F 3/0481 704/235 |
| 2013/0059276 A1* | 3/2013 | Allen | G09B 5/065 434/167 |
| 2014/0024009 A1* | 1/2014 | Nealon | G09B 5/12 434/362 |
| 2014/0035920 A1* | 2/2014 | Duwenhorst | G06T 11/001 345/440 |
| 2016/0019816 A1* | 1/2016 | Parry | G09B 5/06 704/2 |
| 2016/0027471 A1* | 1/2016 | Gottlieb | G06F 3/0482 386/241 |
| 2016/0133154 A1* | 5/2016 | Cortes | G09B 5/00 434/157 |
| 2016/0180730 A1* | 6/2016 | Lee | G09B 19/06 434/157 |
| 2016/0253999 A1* | 9/2016 | Kang | G10L 25/60 704/249 |
| 2017/0133007 A1* | 5/2017 | Drewes | G10L 15/063 |
| 2017/0161014 A1* | 6/2017 | Kikugawa | G10L 15/04 |
| 2017/0256271 A1* | 9/2017 | Lyon | H04N 21/4334 |

* cited by examiner

PRODUCTION AND PRESENTATION OF AURAL CLOZE MATERIAL

CROSS-REFERENCE TO RELATED APPLICATIONS

This application is a Continuation of co-pending U.S. patent application Ser. No. 16/423,100 titled "PRODUCTION AND PRESENTATION OF AURAL CLOZE MATERIAL", filed on May 27, 2019 the disclosure of which is herein incorporated by reference in its entirety.

PATENTS CITED

The following documents and references are incorporated by reference in their entirety; De Ley et al (US Pat. Pub. No. 2006/0292529), Wen (U.S. Pat. No. 6,341,959), Ferrell (U.S. Pat. No. 5,885,083), Budra (U.S. Pat. No. 6,726,486) and Nguyen (PCT/AU2012/001531).

FIELD OF THE INVENTION

The present disclosure relates to systems, methods, and media for teaching, including teaching a language and teaching language skills.

DESCRIPTION OF THE RELATED ART

Cloze exercises are well known in the field of language learning and cognitive testing. The term "cloze exercise" is understood to refer to written material that includes one or more blanks where one or more words have been omitted. A student attempts to fill in the blanks by an understanding of the surrounding text. This technique has widespread use in education generally, and language teaching in particular. While other modalities using the cloze concept are known, written cloze so predominates that it is simply referred to as cloze.

Another modality is listening, or aural, cloze where an instructor recites a phrase, sentence, or passage while omitting a selected word. The instructor may hum at the point of the cloze word. The student listens to the instructor and attempts to provide the omitted word.

There has been relatively little use of pre-recorded material in aural cloze. Adapting aural cloze exercises to an e-learning environment may involve taking a recorded passage and producing an obfuscating sound over a selected word or words in the passage. Alternatively, the time occupied by the cloze word can be entirely silenced. Both of these manners of obfuscation can result in passages that sound awkward and disorienting to listeners. Accordingly, there is a need to obfuscate cloze recordings in a manner that is perceived as more natural for listeners.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the problem of an aural cloze exercise delivered by a machine where an arbitrarily chosen portion of an audio file can be selected as the cloze portion to be obfuscated and played without the degree of difficulty of deducing the cloze portion being exacerbated by the short time duration of, the naturally spoken cloze portion, is solved by a system that automatically and selectively extends the time of the selected portion beyond its natural length. The aural cloze obfuscation can be accomplished by silence or by a superimposed masking sound or a replacement sound. If desired, certain embodiments can have accompanying video of the speaker and obfuscation of the speaker's mouth can be enabled. Using audible and visual components, multiple degrees of overall obfuscation can be presented.

In one aspect, the invention is about a method for preparing an aural cloze exercise for use with a system, the method performed by at least one computer processor and a memory executing computer program instructions, to perform the steps of: accepting a demarcation of a portion of a natural spoken word audio passage, the demarcation designating a cloze word having a time slot in the passage of an original duration and starting location, other portions of the passage comprising context material; calculating an elongated time for the cloze word's time slot duration, the elongated time effective to improve the average success rate of an aural cloze exercise; and producing a data file comprising one or more segments of digital audio content representing the spoken word passage, information indicative of the cloze starting location, and of the calculated elongated time, where the data is configured to be played on a compatible player audibly producing the spoken word passage with the cloze word's time slot duration elongated to the calculated time, with obfuscation applied over the elongated duration and not applied to context material.

In another aspect, the data is configured to be played on a compatible player in a second mode audibly producing the spoken word passage substantially as originally recorded. In yet another aspect, the calculated time comprises a predetermined minimum time, a predetermined maximum time, or a time generally proportional to the original duration that proportional time falls between the minimum and maximum predetermined times. In another aspect accepting a corresponding video sequence that includes a representation of a mouth speaking the passage in synchrony with the produced audio; and where the data is further configured to be played by a compatible player in a mode where the video is selectively obfuscated during any audio obfuscation. In yet another aspect, the data is further configured to be played on a compatible player in a mode where the cloze word is obfuscated in the produced audio but not obfuscated in the video.

In one aspect, the invention is about an aural cloze exercise system having at least one computer processor and a memory, said system configured to receive a digital audio spoken word passage, wherein said system comprises: an operator interface module providing a facility to select a portion of said passage as a cloze word, a calculation module to compute an elongated time duration for said cloze word, an obfuscation module, wherein said system is configured to output a package of player data that is interoperable for input to a specialized player, said player data comprising: audibly unchanged audio of said spoken word passage other than said cloze word, audibly unchanged audio of said cloze word, the elongated time duration and a designation of said cloze word starting time and ending time in the passage and at least one obfuscation selection. In another aspect, the outputted player data further comprises digital media containing a visual representation that includes a mouth speaking the passage synchronized to the audio of the passage.

In one aspect, the invention is about a method of teaching using a computing device with audio output to play an aural cloze exercise, said method comprising: audibly playing a first cloze exercise where a connected speech passage is played with the time slot of a cloze word elongated an effective amount to improve cloze exercise success, the effective amount being an amount resulting a greater average success in relation to the same passage with the same cloze word and obfuscation where the time slot is not elongated. In yet another aspect, audibly playing the connected speech passage naturally, without elongation or obfuscation of the cloze word. In yet another aspect presenting a video segment including a portrayal of a mouth saying the passage is played simultaneously, and in synchrony, with the audible cloze exercise, and where the mouth portrayal is substantially equally visible during the cloze word and during context material. In another aspect, a step of presenting the audible cloze exercise with selective obfuscation, but without a mouth visible during the time slot of the cloze word.

In one aspect, the invention is about a method for determining an effective time elongation of an aural cloze word's time slot using at least one computer processor and memory executing computer program instructions to perform said determination, said method comprising the steps of: accepting a digital audio spoken word passage with indication of an included cloze word, determining the time length of the cloze word in the audio passage and computing, using a heuristic, an effective amount of time to elongate the cloze word's time slot during obfuscation to improve cloze exercise success with respect to similarly obfuscating the cloze word, but with no perceptible change to the timing. In another aspect, the heuristic provides for a minimum total cloze time slot duration, a maximum total time slot duration and provides for intermediate cases where the effective time elongation is generally proportional to the length of the cloze time slot. In yet another aspect, the determining and computing steps are fast enough to be real-time.

In one aspect, the invention is about a media player having a computer processor and a memory, said player configured to receive a package of data related to a recorded spoken word audio passage comprising: a digital audio segment comprising at least the context portions of a spoken word passage, a digital audio segment comprising at least a designated cloze word from the passage, an extended time duration for the cloze word time slot, indication of the starting point of the cloze word in the spoken word passage, at least one obfuscation selection and said player further configured to play a version of the spoken word passage with the time slot of the cloze word elongated to the time duration and the cloze word silenced or obfuscated. In another aspect, also playing the combined context portion and cloze word with no obfuscation and/or time elongation. In yet another aspect, said data package further comprises a video segment including a portrayal of a mouth speaking the passage and where said player has a mode of presentation where the video and audio are played in synchrony.

In one aspect, the invention is about a non-transitory computer-readable medium comprising computer program instructions executable by at least one computer processor to perform a method for use with a system, the method comprising: presenting an aural cloze exercise where having an audio output facility causes the one or more processors to audibly play a first cloze exercise where a speech passage is played with the time slot of an obfuscated cloze word elongated an effective amount to improve cloze exercise success. In another aspect, said computer program instructions further cause the one or more computer processors to present a visual depiction of a mouth speaking at least some of the words of the passage in synchrony with the audibly played first cloze exercise.

Other features and advantages of the present invention will become apparent upon examining the following detailed description of an embodiment thereof, taken in conjunction with the attached drawings.

DETAILED DESCRIPTION OF THE PREFERRED EMBODIMENT

Figure 1A:
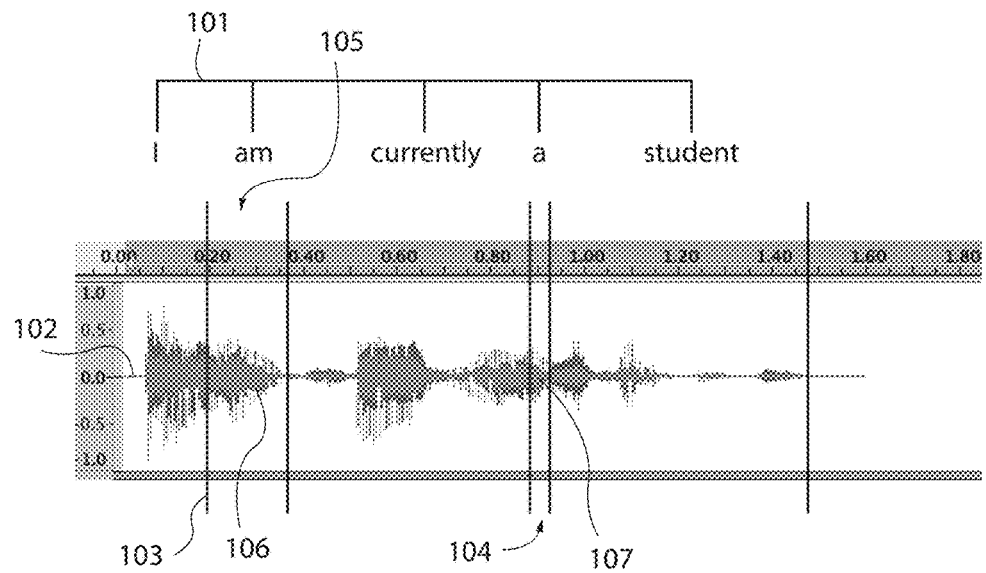
FIGS. 1A-1C are timeline diagrams of a presentation of a media file with connected speech, according to an illustrative embodiment of the invention.

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The teachings may be embodied in various forms. Well-known functions or constructions are not described in detail to avoid obscuring the present disclosure in unnecessary detail. Specific structural elements and functional details disclosed herein are not to be interpreted as limiting, but merely as a basis for the claims and as a representative basis for teaching one skilled in the art to variously employ the present disclosure in a manner suitable for the application.

The term "computer system," as used here, not only includes a discrete computer having one or more computer processors and memory, but also may include a cluster of computers, a cloud-based distributed computing service, and/or an embedded microcomputer based system. Aural obfuscation, as used here, is a manipulation of an audio waveform that makes one or more words difficult or impossible to hear. Specific techniques include completely muting the audio during a word; reducing volume during a word; superimposing another sound on top of the region to be obfuscated, at a desired intensity; and replacing the word's sound entirely with another sound. The sounds used for masking and substituting can include almost any sound. Usual sounds include noise, a beep, and a hum.

These teachings include extending the period of the cloze word beyond its natural time by an effective amount. The portion of a passage or phrase that is omitted or obfuscated in a cloze exercise is called the "cloze word." It may, in fact, be two or more adjacent words. An experienced language learning professional can recognize an effective amount of time elongation. It is an amount that improves average performance on an aural cloze exercise in comparison to the average performance when the period of the cloze word is not extended.

In a cloze exercise, context words or context material includes the content other than the designated cloze word. The natural length of the time slot for a word is the time from its start to finish as originally recorded. A natural spoken word passage is one spoken by a fluent speaker at a natural timing. This encompasses a very wide range of pronunciation and timing. When the term "teaching" is used as a goal or purpose of the disclosed systems and methods, it encompasses any phase of teaching from instruction to evaluation.

Aural, or listening, cloze has been underused as a tool in language learning. This disclosure identifies a root cause of the difficulty in using recorded aural cloze. Unlike a standard cloze exercise appearing statically in black and white on a page, an aural cloze exercise has timing properties and that makes a qualitative difference. A timing issue is identified in this disclosure as the source of the deficiency in current recorded aural cloze presentation. Silencing the cloze word, or otherwise obfuscating it with another sound, can result in an audio presentation that is awkward to decode, even for a native speaker, thus reducing its value in teaching or evaluation. Especially for shorter words, the space left where a word was silenced or "beeped over" may not be long enough for a listener to grasp the tempo of the passage as a whole and to realize that a word is missing and that an 'aural cloze' is being presented.

When obfuscation is applied to a cloze word without elongation of the cloze period, or time slot, the resulting experience can be one where the user is disoriented and unable to process what they have heard. It can also result in the user not even realizing that obfuscation has occurred. It can even a result in both of those things happening. They do not realize that an "aural blank" has been presented, because the short time period made it too hard to mentally process and decode. It may seem to the user like a technical error has occurred, or even that nothing has occurred. Extending the cloze time period makes it clear that an "aural blank," corresponding to the printed blank in a standard written cloze, has been presented to them.

There is frequently no space between words in the audio waveform of connected, natural speech. Obfuscating the cloze word without extending the cloze period, especially in cases where there is no space in the audio waveform between a cloze word and an adjacent context word, result in listener disorientation failure of the listener to realize that an "aural blank" has been presented, or both.

Figure 1B:
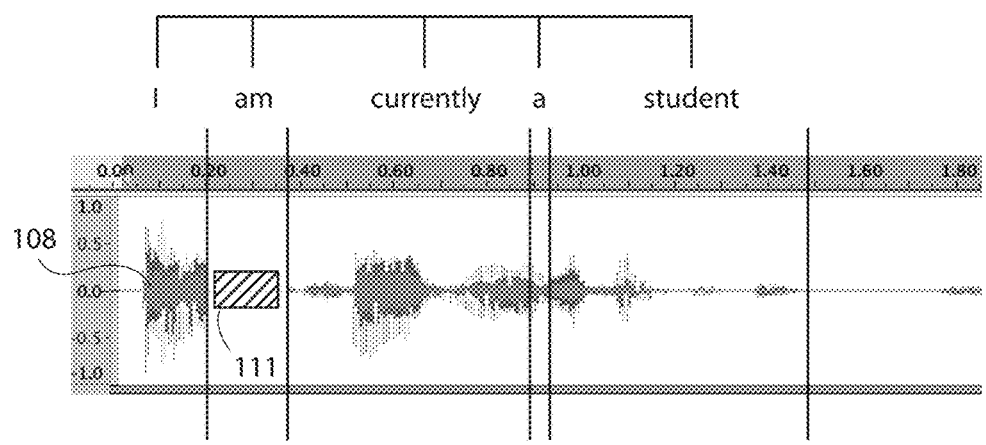
Figure 1C:
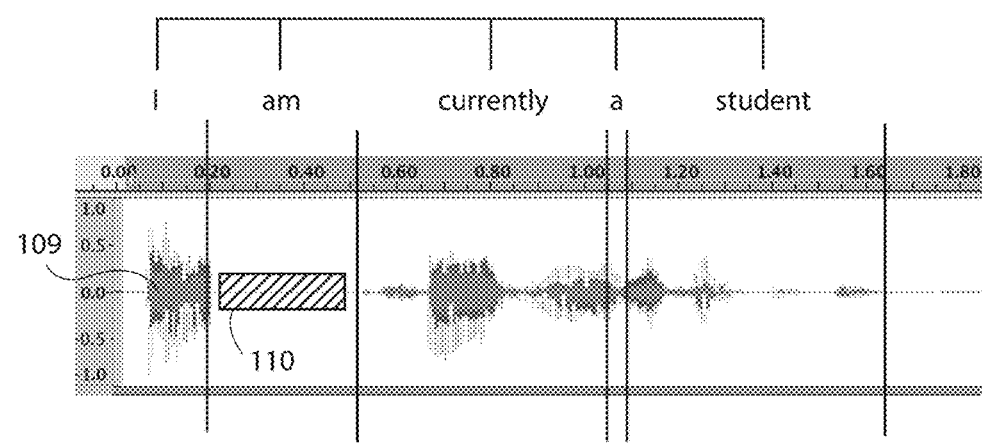

Referring to FIG. 1A, we see how it shows a waveform 102 of "I am currently a student" 101 spoken at a natural rate by a native speaker with the words and time scale 105 shown above the waveform. The vertical lines 103, 106, 104, 107 are dividers between words. In this figure it is clear that the "I" and the "am" result in a single continuous sound 106. Also note that the "a" sound 107 is fluidly contiguous with the words on either side of it. Silencing the block of time of the "am" produces the waveform 108 in FIG. 1B. This results in a silent period 111 of about 0.1 seconds. This may be too short a time for the student to mentally "fill in the blank." FIG. 1C shows the same starting material, but has a waveform 109 where the time slot that was occupied by the "am" increased in duration 110. This illustrates the idea that the missing or obfuscated word is more readily discernible in connected speech if its natural duration is extended to an effective amount of time. In a surprising result it has been observed in informal experiments that too large an elongation can result in a disturbance to the prosody of the phrase or sentence sufficient to fracture its context. A long break in the flow of the passage can actually make it harder to determine the missing word from the context. Methods of determining an effective elongation are discussed below.

Figure 2:
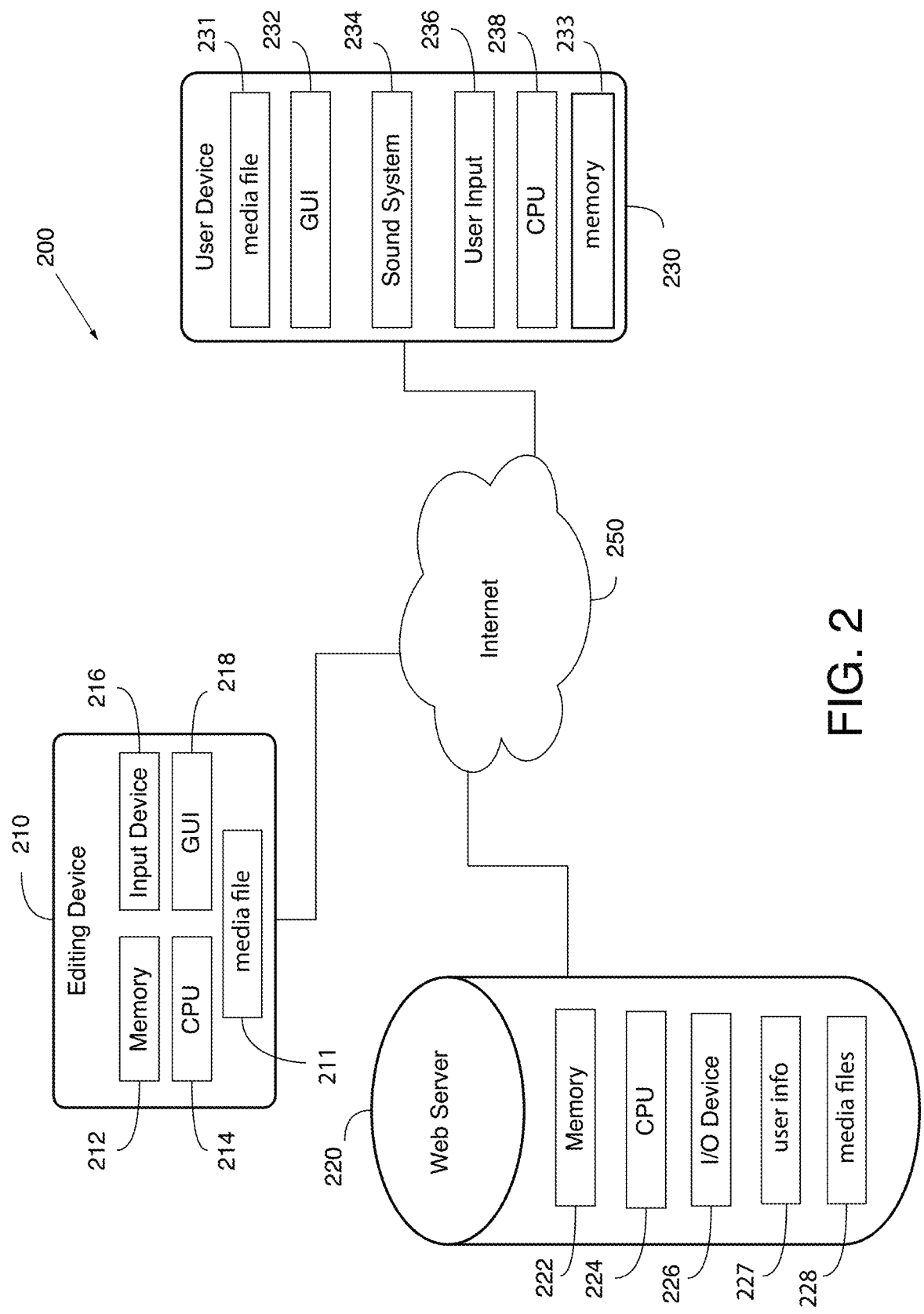
FIG. 2 is a block diagram of a first language learning system in accordance with the present disclosure, according to an illustrative embodiment of the invention.

FIG. 2 illustrates a first language learning system 200 configured to perform the methods of the present disclosure using one or more modules/components, each comprised of combinations of hardware and software, including but not limited to operator interface modules, calculation modules and obfuscation modules. In one embodiment, the language learning system comprises an editing device 210, a web server 220, and a user device 230. The editing device is shown in electronic communication with the web server through the Internet 250. The editing device and web server may be in electronic communication through the Internet or through another type of network, such as a local area network. The editing device and web server may be controlled by the same party, or by mutually distinct parties. In some embodiments, the editing device and the web server are components of a single computer system.

As shown, the web server may be in electronic communication with the user device through the Internet. The web server may alternatively be in electronic communication with the user device through another type of network, such as a local area or cellular network. The web server can typically be capable of concurrent communication with multiple user devices.

The editing device module(s) allows an operator to edit a media file for use in an aural cloze exercise. Certain editing functions may alternatively or additionally be performed by the web server or user device. The editing device includes memory 212, a CPU 214, input devices 216, and a GUI 218. Memory is a memory storage unit, such as RAM or a hard disk, for storing a media file 211. Memory may also store media editing software for editing a media file. The input devices may include a keyboard and mouse. In other embodiments, an input device may include a touch screen. In some embodiments the input devices may include a microphone having a corresponding voice recognition computing module. An operator uses the input device to enter instructions for editing a media file. CPU 214 is a processor that processes the instructions for editing a media file. GUI 218 is a graphical user interface that allows the editor to view a media file during editing.

Web server 220 comprises memory 222, a CPU 224, and an I/O device 226, user info 227, and media files 228. The memory stores media files used in cloze exercises. Memory further holds software for presenting media files. Memory may further store cloze program data, such as a database for storing user information, as will be described in greater detail below. Memory technology may include RAM, hard disks, and other well-known electronic devices for data storage. CPU 224 is a central processing unit that processes and executes instructions, such as instructions for storing data, sending data, and processing input. I/O device sends output and receives input through Internet 250. In some embodiments, the web server may be a cloud computing server or a series of servers available over the Internet. In some embodiments, the editing device and web server may be a single, fully integrated system.

The user device 230 is an electronic device, such as a personal computer, tablet computer, smart phone, or smart TV that an end-user may play the aural cloze exercises on. The user device comprises a GUI 232, a sound system 234, a user input 236, a CPU 238, a media file 231, and memory 233. The GUI is a graphical user interface on which a user may view optional visual aspects of an aural cloze program, as will be described in greater detail below. A sound system allows a user to hear audio of an aural cloze program. The sound system may include a soundcard, an audio port, speakers, and headphones. The user input facility allows a user to select program options and input responses to cloze exercises. User input may include a physical keyboard, virtual keyboard, mouse, audio input and touch screen. The CPU is a central processing 210 unit for processing and executing instructions.

In an example method of using this language learning system, an operator edits media files with the editing device 210. Editing using the editing device may comprise actually transforming the media files such that the web server 220 serves no, or minimal, editing functions. The editing may include creating multiple media files from an original media file, where each media file presents different types or levels of obfuscation. Alternatively, the editing process in the editing device may consist of simply designating portions of the media files as cloze portions, with actual media manipulation done later in the process by the web server, or on the user device. Cloze portions may be designated by start times and/or end times or durations indicated within the media files. Alternatively, this time-designating metadata may be in an associated file leaving the actual media file unaltered.

After editing, the media files are transferred over the web. The web server receives the files and stores them in memory 222. A person using the user device 230 logs into the web server and selects program options, as will be described in greater detail below. The web server prepares a corresponding data package including media files, obfuscation choices, timing information, and program information and sends the files and information to the user device. The user device presents the user with the aural cloze material where the silenced or obfuscated word's time slot is elongated from its original length. The user then inputs responses to cloze exercises through user input 236. CPU 238 can transmit the user input to the web server for evaluation or compilation. Alternatively, the web server can send evaluation information to the user device so that CPU 238 may evaluate the user responses locally on the user device. In that case, after the user completes a set of cloze exercises, the user's performance data can be transmitted to the web server and stored in its memory.

Figure 3:
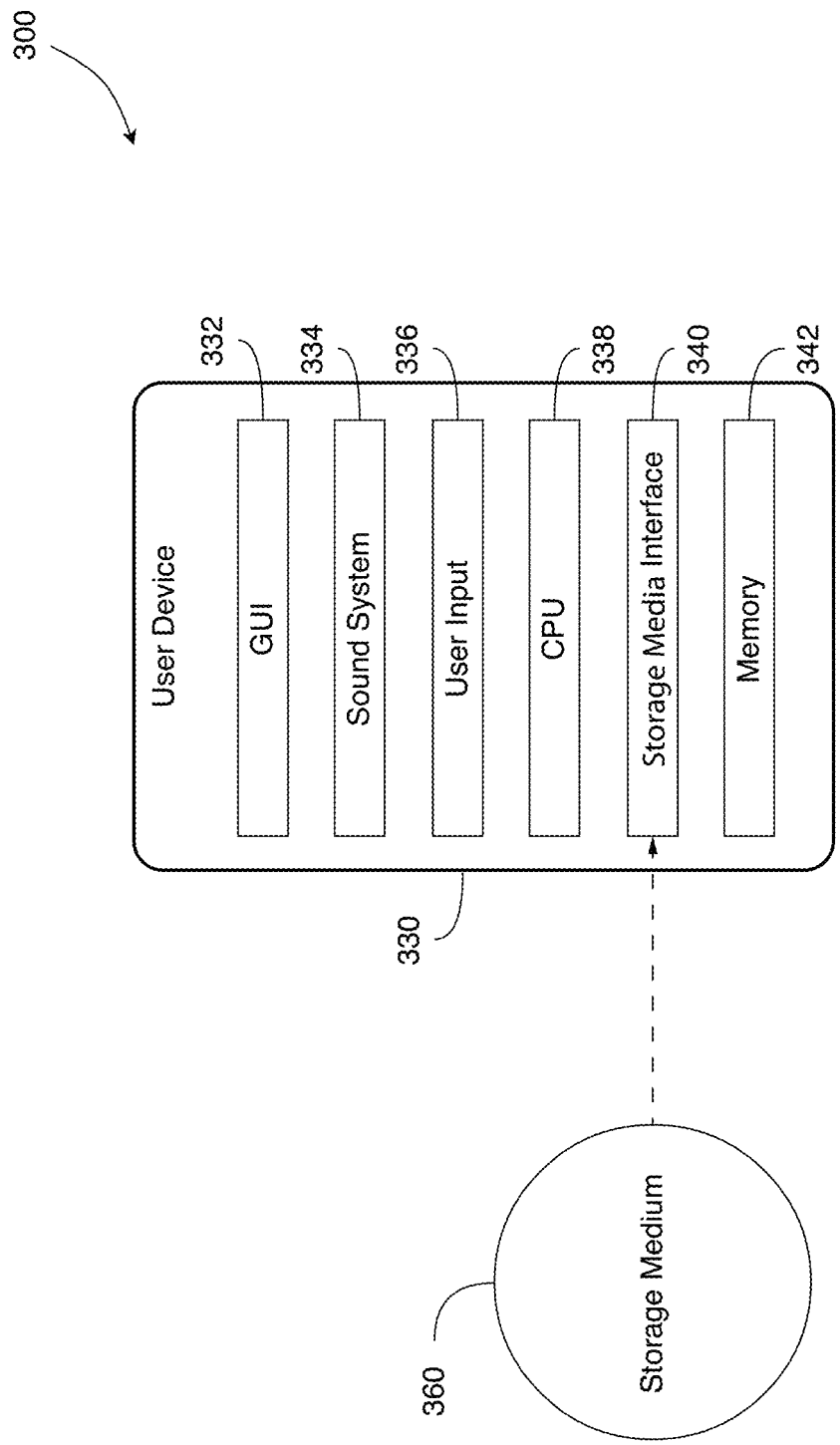
FIG. 3 is a block diagram of a second language learning system in accordance with the present disclosure, according to an illustrative embodiment of the invention.

FIG. 3 illustrates a portion of a second language learning system 300, according to another embodiment of the present disclosure. This language learning system is similar to the first language learning system and shall be described only in detail necessary to illustrate the differences between them. This language learning system comprises a computer-readable storage medium 360 and a user device 330 similar to the user device 230 of FIG. 2.

The computer-readable storage medium is a medium that stores data readable by a computer, such as in a floppy disk, CD, DVD, or SD card. In some embodiments, the computer-readable medium may be cloud storage. The computer-readable medium stores data, and possibly program instructions for running an aural cloze program.

The user device 330 comprises a GUI 332, sound system 334, user input 336, CPU 338, storage media interface 340, and memory 342. The media storage interface is a portion of the user device that provides for accepting data from the computer-readable medium. The storage interface may be, for example, a CDROM drive, DVD-RW drive, a USB port, an SD interface, or circuitry for accessing storage over a network.

A user wishing to initiate an aural cloze exercise program operatively connects the computer-readable medium to the media storage interface. The media storage interface reads data from computer-readable medium and forwards the data to appropriate components of the user device. The aural cloze material as presented to the student can have an elongated time slot at the point of the obfuscated word. For example, audio data would be sent to sound system 334 while display information would be sent to GUI 332. Data read from a computer-readable medium may also be stored in memory for quicker access. The aural cloze exercise program may be installed in memory from the computer-readable medium. CPU 338 could then, at any time, process data and media files installed as in-memory speech, without necessarily retaining the connection between the computer-readable medium and to the user device. User result information could be stored in memory or written to the computer readable medium.

In another embodiment, a system consistent with these teachings is comprised of a series of modules, embodied in either hardware or software, that include an elongation calculation module, one or more obfuscation modules or filters, and a time stretching module.

The modified audio material presented to the user may have been modified at one of several stages in a system consistent with this disclosure. At the time of editing, or authoring, multiple copies of the material could be created, each with a different level and method of obfuscation. At the other extreme, authoring could create metadata associated with the audio material that allows production of one of several obfuscations in real time by the user device's CPU.

Another teaching of this disclosure is using a visual representation of a speaker's face saying the passage in sync with the audio. This can provide a hint to the user and, like the audio, can have degrees of obfuscation. A large portion of the face, including the mouth, might be covered or pixelated during the cloze word's time slot. A less obfuscated video embodiment would be coverage or pixilation of a small area tightly drawn around the mouth, leaving other facial features visible. To keep synchronicity and provide an enhanced hint, the video presented during an extended cloze slot can be a uniform slowing of the video time-base during that time. Video clues can be combined with placeholder clues, textual clues, etc.

Figure 4:
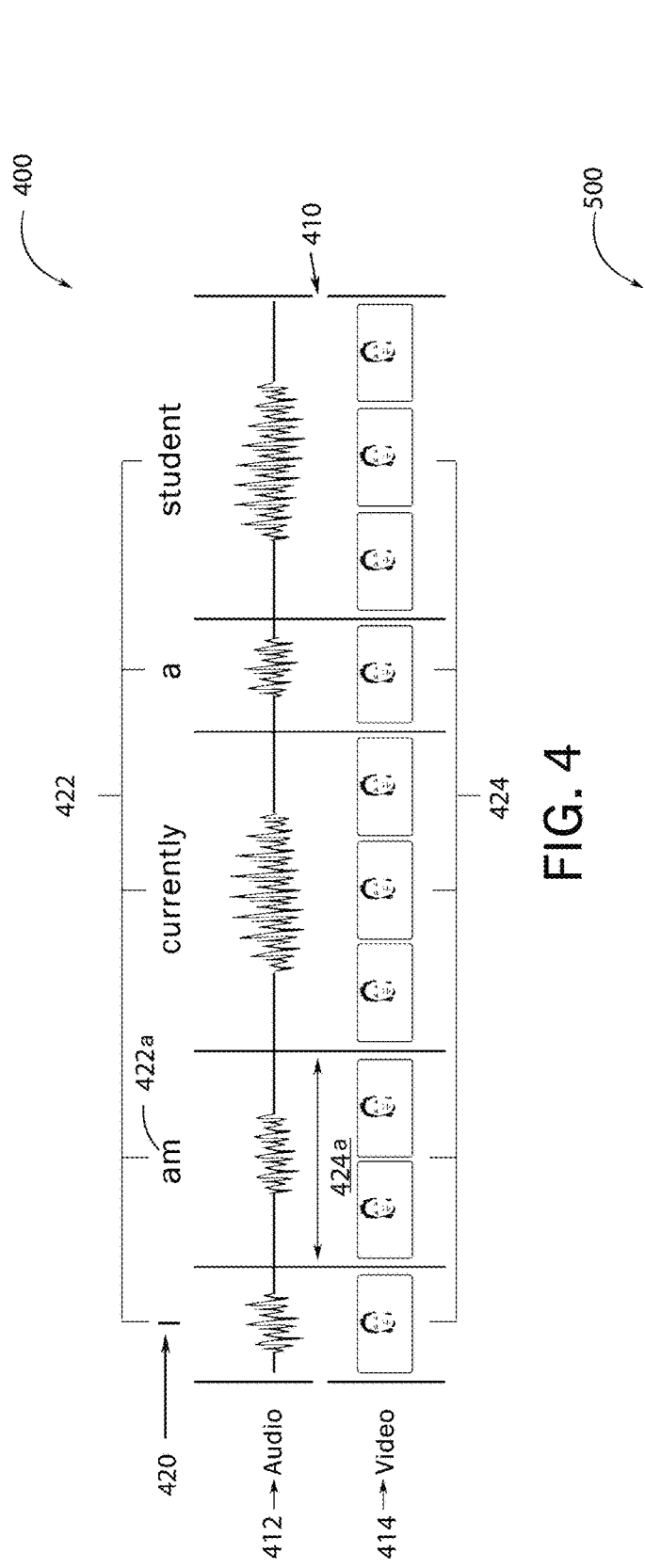
FIG. 4 is a timeline diagram of a media file in accordance with the present disclosure, according to an illustrative embodiment of the invention.
Figure 5:
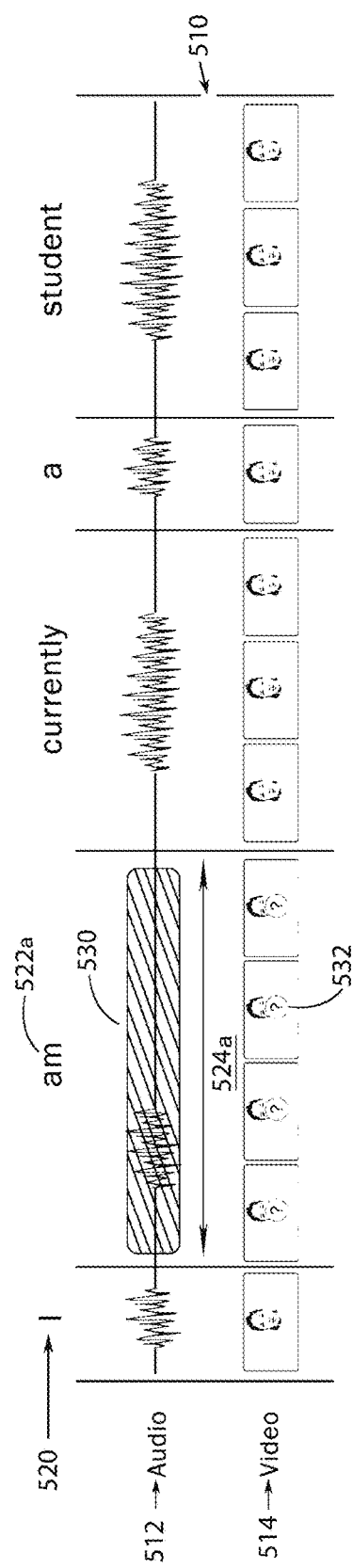
FIG. 5 is a timeline diagram of a media file with an extended block, according to an illustrative embodiment of the invention.

FIGS. 4-5 illustrate a presentation 400, 500 of a media file according to an embodiment of the present disclosure. The file itself may have a common audio and/or visual media file format such as .mp3, .wav, .mov, .wmv, or .mp4. The passage in the media file is a recording of a speaker speaking a phrase 420. The phrase is composed of words 422. The presentation may be visualized as a timeline 410. This overall timeline has an audio timeline portion 412 and a video timeline portion 414. In some embodiments, a video component and an audio component of the recording are stored as separate media files. Not every implementation will include video. The timeline 410 is shown divided into blocks 424 corresponding to speaking times, or time slots, of words 422. A cloze word 422a can be chosen from the passage to be obfuscated for an aural cloze exercise during an editing operation; an operator may demarcate blocks 422 as cloze material. Alternatively, blocks 424 may be demarcated by language analysis software.

The cloze word, in this case, "am" 422a may have been selected to be the cloze word automatically or by an operator at authoring time. In some embodiments the student may have an option of choosing to receive cloze words that are in a category, for example, a particular part of speech.

The word "am" has a corresponding natural block time slot. The duration of that time slot has a natural length corresponding to the natural, actual recorded pronunciation time of cloze word "am". As mentioned above, a calculation can be done to determine an effective elongation time. The extended block time slot 524a has an extended length greater than the natural length of block 424a. The extended length may be achieved by a proportional scaling of the natural length. Alternately, the extended length may be created by adding a fixed padding to the natural length. In some embodiments, the extended length may be a predetermined fixed length that is used regardless of the natural length. Some heuristics may be used to determine an appropriate elongation that is neither too short nor too long for user success.

Figure 6:
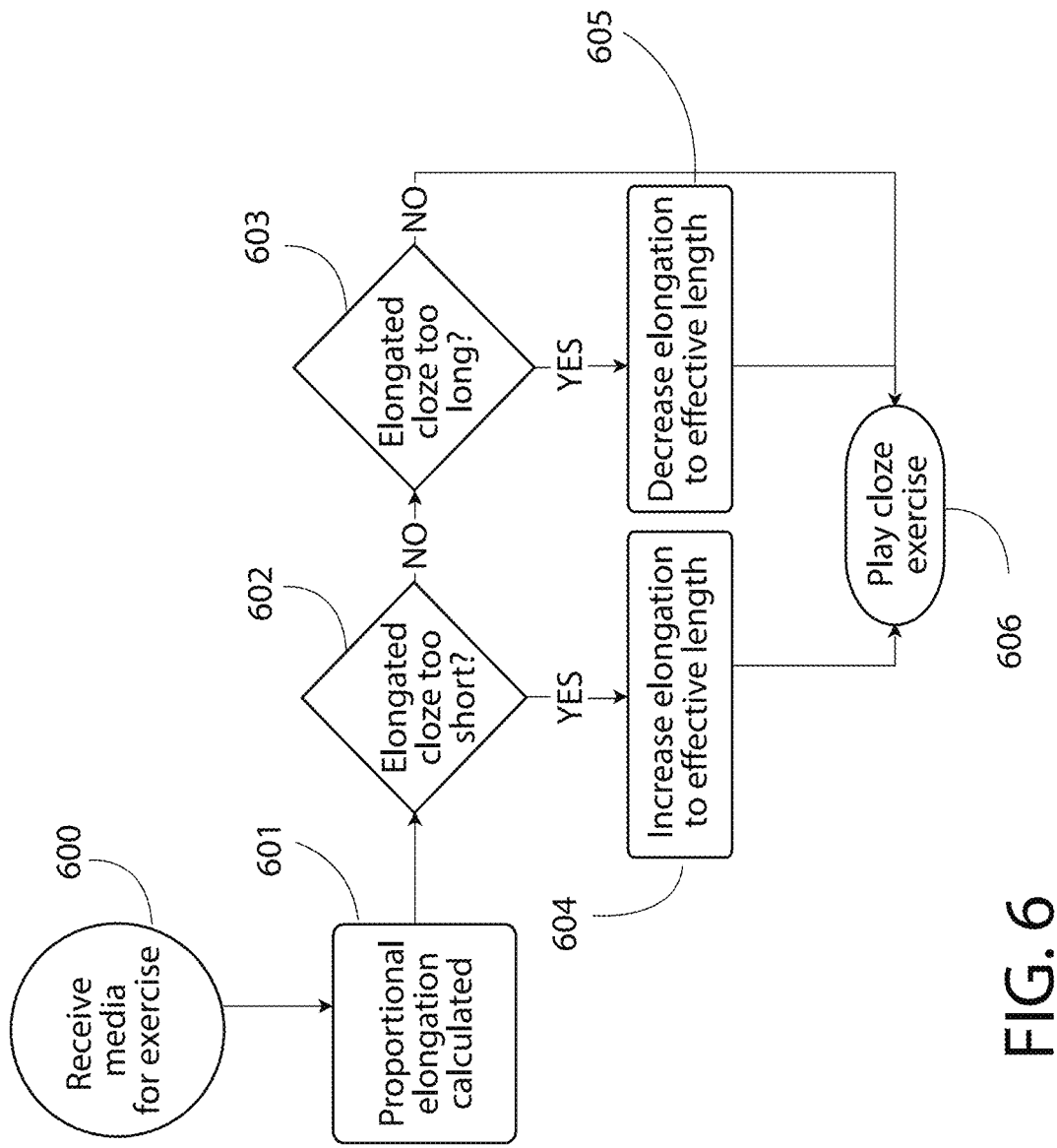
FIG. 6 shows a simple method for calculating an effective duration of an elongated cloze interval, according to an illustrative embodiment of the invention.

Some methods of calculating the elongation can produce an effective elongation. One way of doing this it is shown in FIG. 6. After receiving audio media and associated metadata 600 an initial presumed elongation is determined by a proportional scaling of the natural length 601. Experimentation has shown that a scale factor of two can produce an effective delay over a wide range of cases but does not produce an effective elongation in the case of very short or very long words. Therefore, at the next step 602 the presumed elongation is compared to a predetermined minimum time. If the presumed elongation is less than the minimum, the minimum becomes the elongation duration 604. Experiments have shown that one second as a minimum produces an effective elongation for shorter words.

If the presumed elongation is above the predetermined minimum, it is then compared to a predetermined maximum 603. Analogously to the lower limit, if the presumed elongation is longer than the maximum, the maximum is used as the elongated time 605. Experimentation has shown that as the natural time approaches and exceeds three seconds, the natural length itself is an effective upper limit requiring no padding. In a final step, media with the effective elongation is composed and played for the user 606.

An alternate way to illustrate the method is by the equation effective time=min (max (minTime, 2×natural length), max (maxTime, natural length)). More sophisticated methods and algorithms can also produce effective elongated times.

An obfuscation filter or filter module may be removably added to extended block 524*a*. For example, an audio obfuscation filter 530 silences a time slot on audio timeline 512. Alternative audio obfuscation filters may include a beep, a tone, static, and white noise. A video obfuscation filter 532 places a solid circle over a mouth of a speaker during a block on the video timeline 514. Alternative video obfuscation filters may include blurring the mouth or blacking out an entire video component of a block. Obfuscation filters may be added or removed upon a selection by the editor, a selection by the user, or an algorithm designed to challenge the user, as will be described in greater detail below.

Figure 7A:
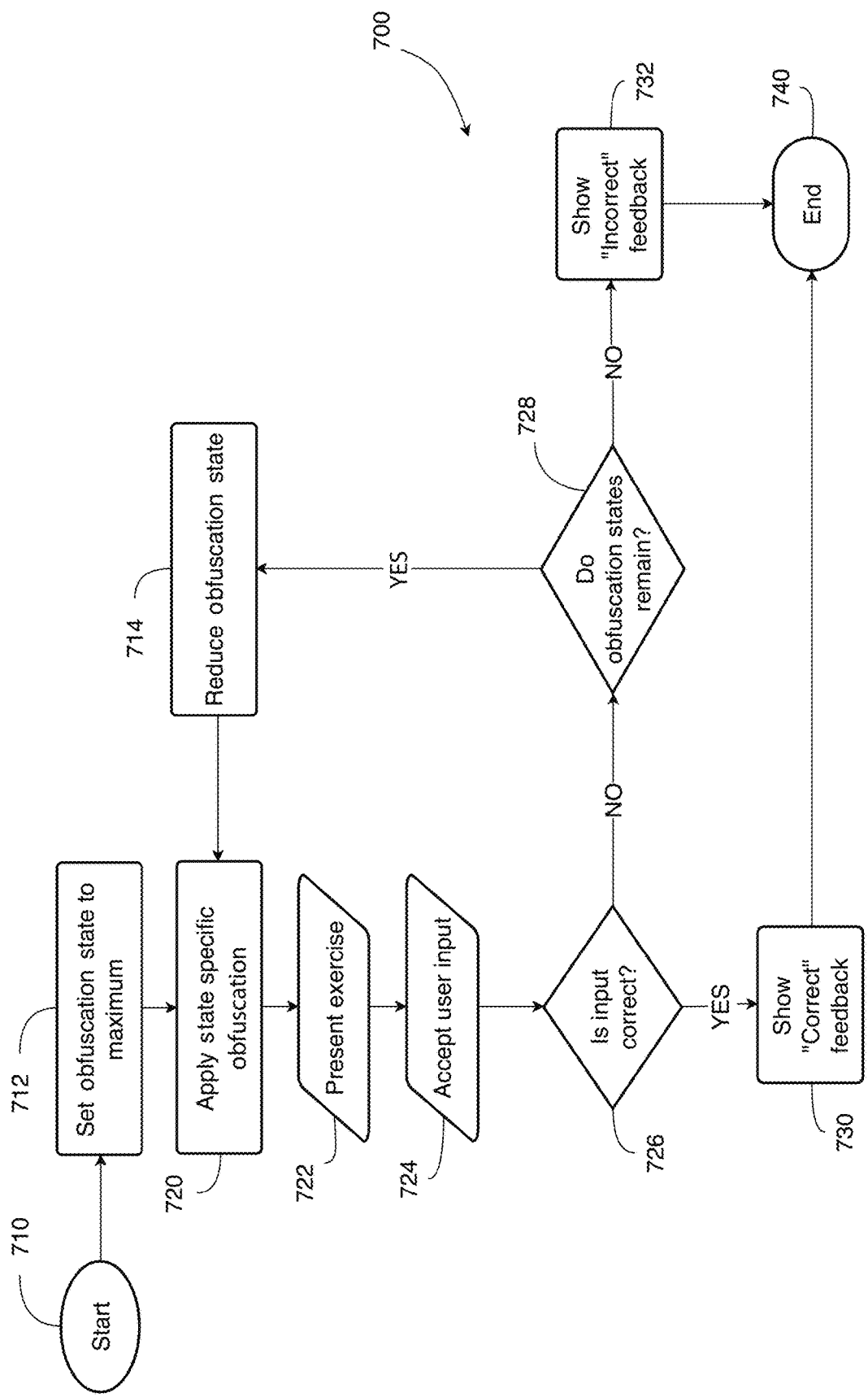
FIG. 7A is a flowchart diagram illustrating operation of a language learning method in accordance with the present disclosure, according to an illustrative embodiment of the invention.
Figure 7B:
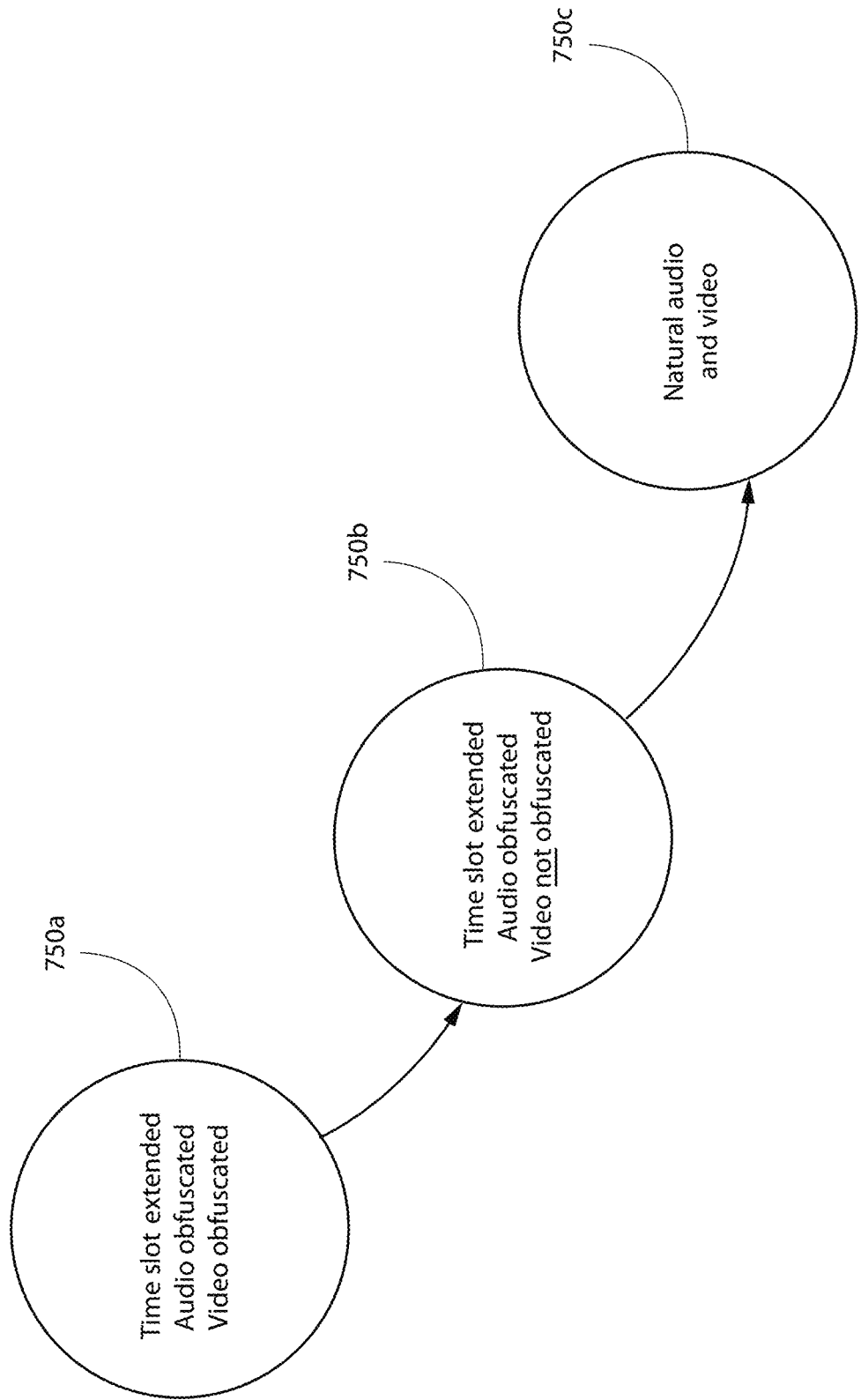
FIG. 7B shows state transitions between decreasing levels of obfuscation, according to an illustrative embodiment of the invention.

FIGS. 7A-7B illustrate an algorithm for presenting an aural cloze exercise to a user in accordance with the present disclosure. FIG. 7A is a flowchart showing progression through various states of obfuscation. An exercise passes through some or all of the states depicted in FIG. 7B. The first state, corresponding to the highest difficulty level and depicted at 750*a*, includes the extension of the aural cloze block, or time slot, duration in addition to obfuscations of both the audio and video components of the media. The second state, corresponding to a medium difficulty and depicted at 750*b*, also includes the extension of the aural cloze block and audio obfuscation, but removes the video obfuscation, allowing the user to use visual clues, such as lip and mouth movements, as a hint. The final state, corresponding to the easiest difficulty and depicted at 750*c*, has no obfuscations and plays the aural cloze block at its natural speed.

Cloze algorithm 700 starts at step 710 and proceeds to step 712, where the obfuscation state is set to the maximum amount of obfuscation At step 720, the appropriate obfuscation state is applied to the media. At step 722, the media file is presented to the user. The media file is presented through a GUI as will be described in greater detail below. At step 724, the user may enter a response to the aural cloze exercise through the GUI. At step 726, the response is evaluated for correctness. If the response is correct, the algorithm proceeds to step 730, at which point the user is given feedback that the response is correct. The exercise then ends at step 740. If not correct at step 726, the algorithm determines if there are remaining obfuscation states that provide less obfuscation. If this is the case, the algorithm proceeds to step 714, at which point the obfuscation state is reduced, following which the algorithm returns to step 720 in the new, easier, obfuscation state. If there are no remaining obfuscation states when test 728 is reached the algorithm proceeds to step 732, at which point the user is given feedback that the response is incorrect. In some embodiments, the correct answer may be presented at this time. The exercise then ends at step 740.

Several variations to the algorithm of FIGS. 7A-7B may be made, depending on program settings. For example, after step 732, the user may be required to input a correct response before the program ends. Another variation would allow a user to replay an exercise multiple times before inputting a response. In another variation, a user may be allowed to submit multiple responses before a layer of obfuscation is removed. In another variation, the user is shown specifically where and how the user's final, incorrect, answer deviates from the correct answer.

FIGS. 8-15 illustrate an embodiment of a GUI of an aural cloze exercise program and operation in accordance with the present disclosure. The embodiment used as an example in FIGS. 8-15 is designed to train and test verb conjugations. Embodiments of the present disclosure may be applied to any language or part of speech, or other aspect of language.

Figure 8:
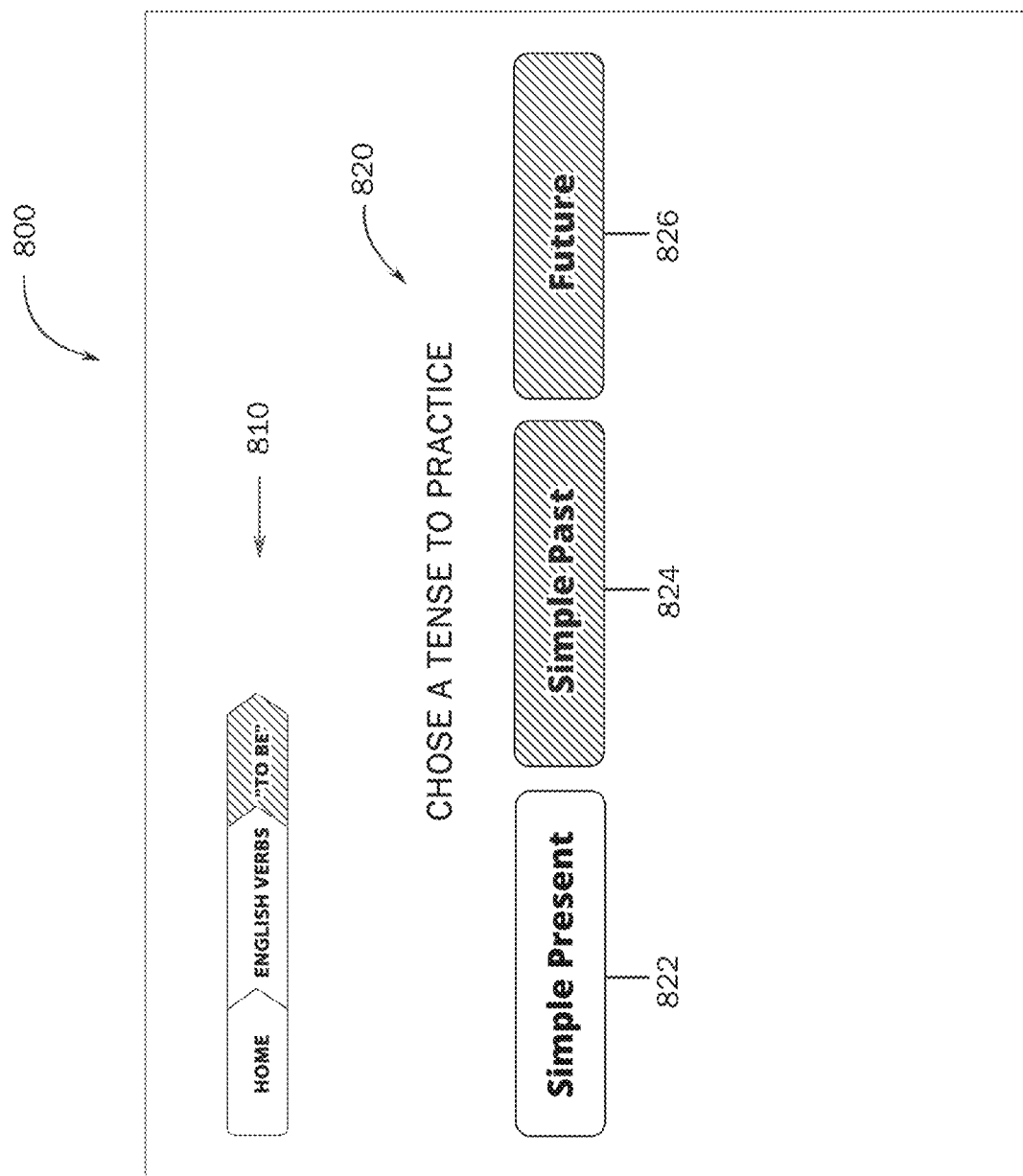
FIG. 8 is a diagram of an aural cloze exercise selection menu of a graphical user interface of a language learning system in accordance with the present disclosure, according to an illustrative embodiment of the invention.

FIG. 8 illustrates an aural cloze exercise selection menu 800 seen by an end user. In this menu, the user chooses aspects of the cloze exercise with increasing specificity. A breadcrumb trail 810 shows options that the user has already chosen. In the present illustration, the user has already chosen to study the English verb "to be." The selection menu presents the user with a tense selection screen 820. In the present illustration, the tense selection screen allows the user to choose (a) the simple present tense, (b) the simple past tense, or (c) the future tense, by clicking one of the three buttons 822, 824, 826, respectively. Once the user chooses a verb tense, shown in this case as the simple present, the aural cloze exercise program proceeds to display and play a corresponding exercise or a series of exercises.

Figure 9:
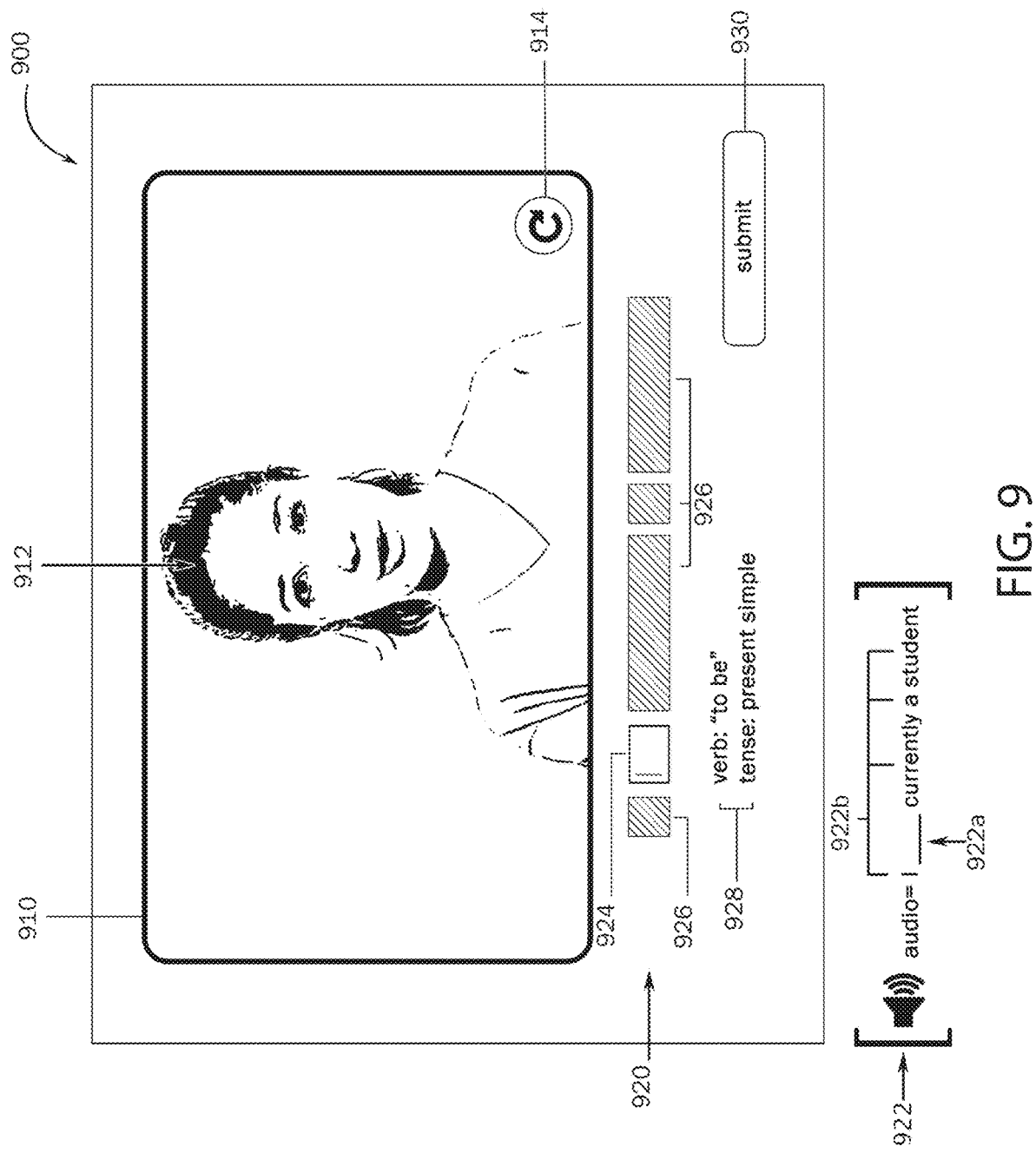
FIG. 9 is a diagram of an aural cloze exercise presentation screen of the graphical user interface of FIG. 8 illustrating an aural cloze exercise, according to an illustrative embodiment of the invention.

FIG. 9 illustrates an aural cloze exercise presentation screen 900 in an embodiment where the education has been "game-ified." In this context both video clues and textual clues are used, as well as placeholders. The cloze exercise presentation screen has a video screen 910 and a response area 920. The video player displays a video of a face speaking the passage in synchrony with the audio. A response area allows a user to submit a response 942 (FIG. 11) to the aural cloze exercise. The player has a speaker 912, a video depiction of a person speaking, and a replay button 914. The speaker recites a game phrase. (The game phrase 922 in FIGS. 9-15 is not visible to the user. The game phrase as depicted is merely illustrating a sample phrase.) The game phrase 922 has an aural cloze portion 922*a* and a context portion 922*b* adjacent to the aural cloze portion. The context portion or portions are audible to the user. In the presently described embodiment, the aural cloze portion is a verb conjugation corresponding to verb and tense selected in selection menu 800. Replay button 914 allows the user to replay the video. The submit button 930 allows the user to finalize the response. In other embodiments, the system may automatically detect the presence of a correct user response entered in the input box, and, upon that detection, automatically display the "correct" message 954 (FIG. 15) within feedback box 950 (FIG. 12 and FIG. 15), without necessitating the user to engage the submit button.

In the presently described embodiment, the input box 924 is adjacent to non-readable placeholders 926. Non-readable placeholders represent words of context portion 922*b*. Positioning of the input box relative to non-readable placeholders assists a user in following along with game phrase 922. In another embodiment, the input box may be adjacent to readable text corresponding to context material. In some embodiments, the input box has neither text nor non readable placeholders.

The response area 920 has a disambiguating clue. The disambiguating clue includes information that limits multiple potential correct answers to a single correct answer. The single correct answer can be ascertained when the disambiguating clue is considered in conjunction with the context portion. In the presently described embodiment, the disambiguating clue is a verb information bar 928 that includes lemma and tense information. In another embodiment, the disambiguating clue may consist of a translation of the game phrase into another language, such as a translation into Spanish if the game phrase is in English. In other embodiments, such as an embodiment with multiple-choice responses, a disambiguating clue may not be necessary, as there may be only one correct response the user may select.

Figure 10:
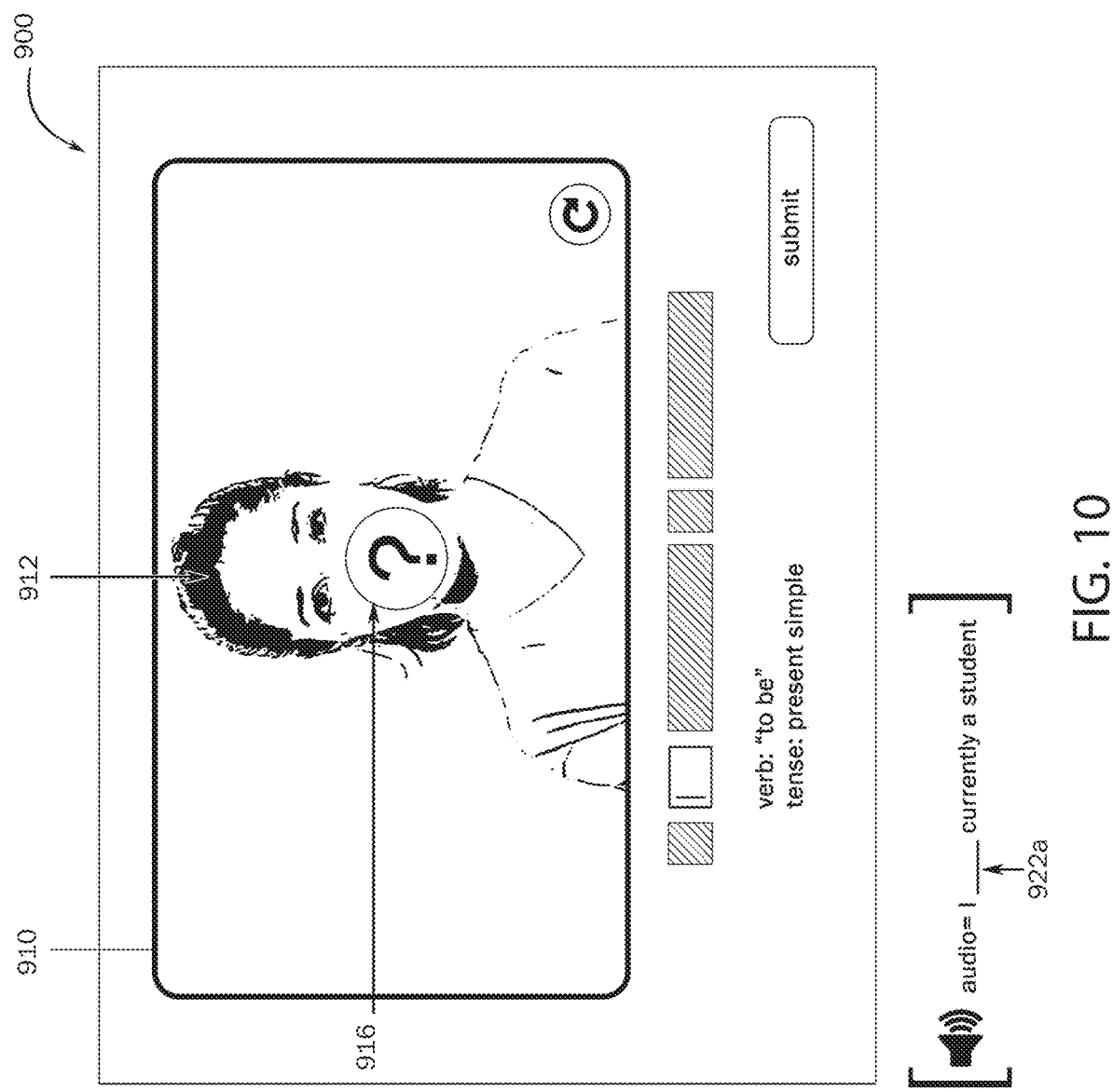
FIG. 10 is a diagram of the aural cloze exercise presentation screen of FIG. 9 having video and audio obfuscation, according to an illustrative embodiment of the invention.

FIG. 10 illustrates video obfuscation of the speaker's mouth 912. A mouth cover 916 covers a significant portion of the speaker's face such that the user would have difficulty using facial features of the speaker as a hint for deciphering aural cloze portion 922a. The cover may be a shape filled with a solid color, such as a black filled circle. Also, the cover may contain text, such as a question mark. In another embodiment, the cover may be a video effect, such as a blurring or pixilation. A cover appears only during aural cloze portion.

Figure 11:
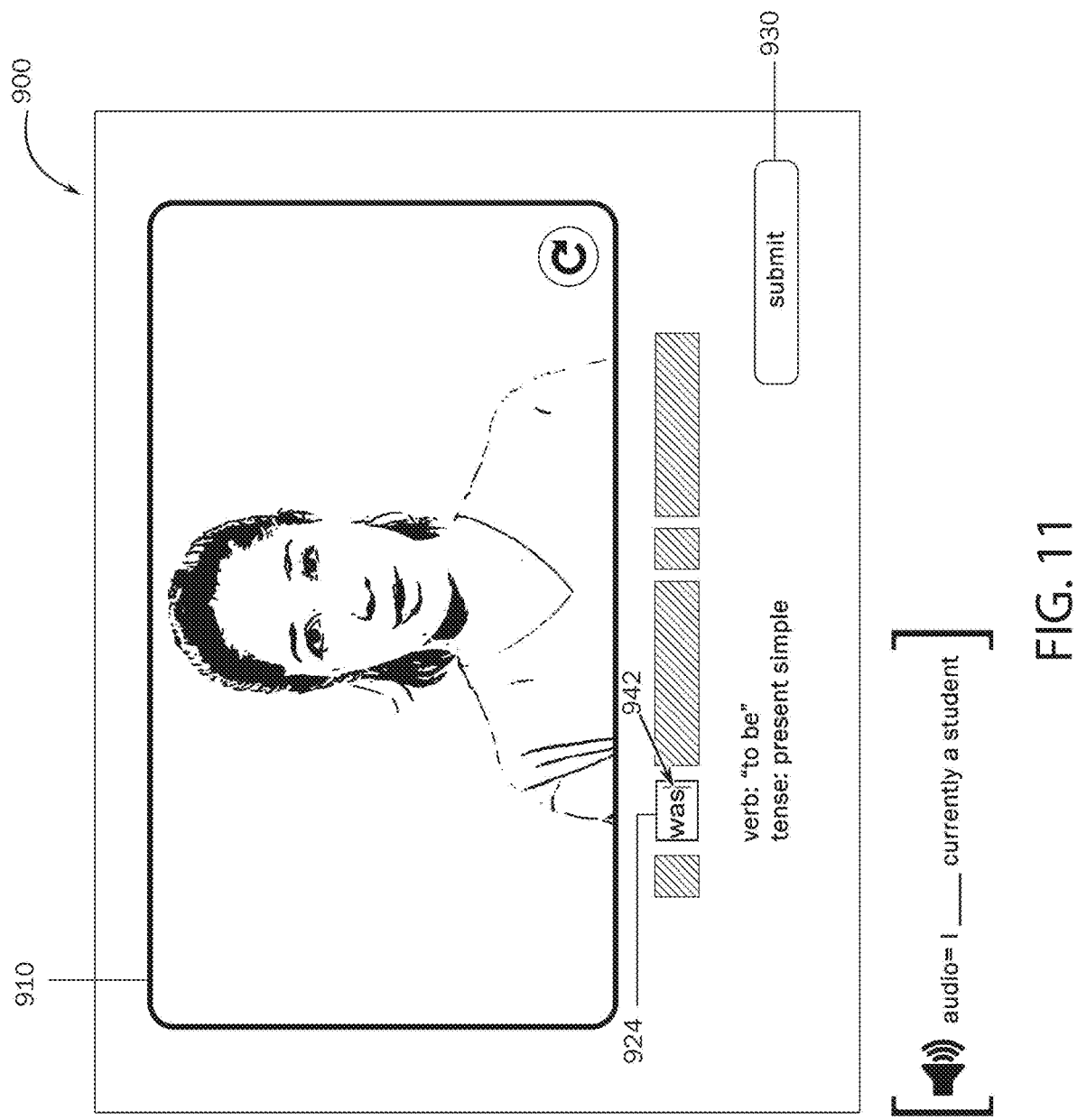
FIG. 11 is a diagram of the aural cloze exercise presentation screen of FIG. 9 illustrating a response from a user, according to an illustrative embodiment of the invention.

FIG. 11 illustrates a response 942 being entered into input box 924. In the presently described embodiment, the user enters responses through a standard input keyboard. In other embodiments, a user may enter responses through a virtual keyboard, a mouse, touch screen, or a microphone having a corresponding voice recognition computing module. For example, in other embodiments, a user may enter a response by clicking a multiple-choice selection or dragging scrambled letters into place. The user clicks the submit button 930 to submit a response for evaluation.

Figure 12:
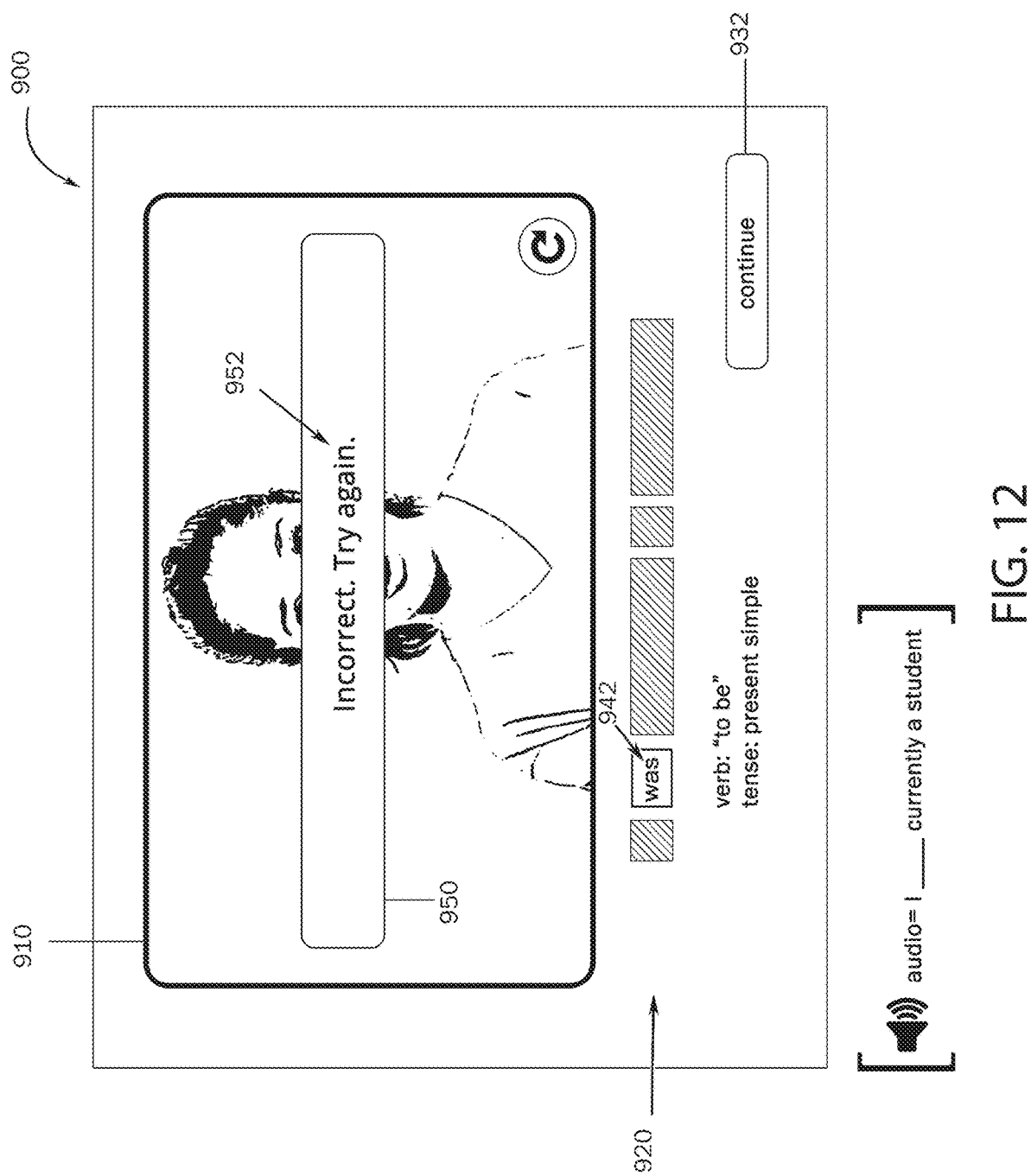
FIG. 12 is a diagram of the aural cloze exercise presentation screen of FIG. 9 displaying feedback of an incorrect response, according to an illustrative embodiment of the invention.

FIG. 12 illustrates feedback for an incorrect response. When a response is submitted and evaluated to be incorrect, a feedback box 950 appears with an "incorrect" message 952 informing the user that response is incorrect. An incorrect message may also suggest that the user try again. If a certain number of incorrect responses have been entered, the incorrect message may include a correct answer. An incorrect message may further include letter-by-letter feedback, such as a striking through incorrect letters of response and inserting underlined correct letters therein. The user may press a continue button 932 in order to continue with the exercise or continue to another exercise. The continue button may be present in place of the submit button 930 in the response area 920.

Figure 13:
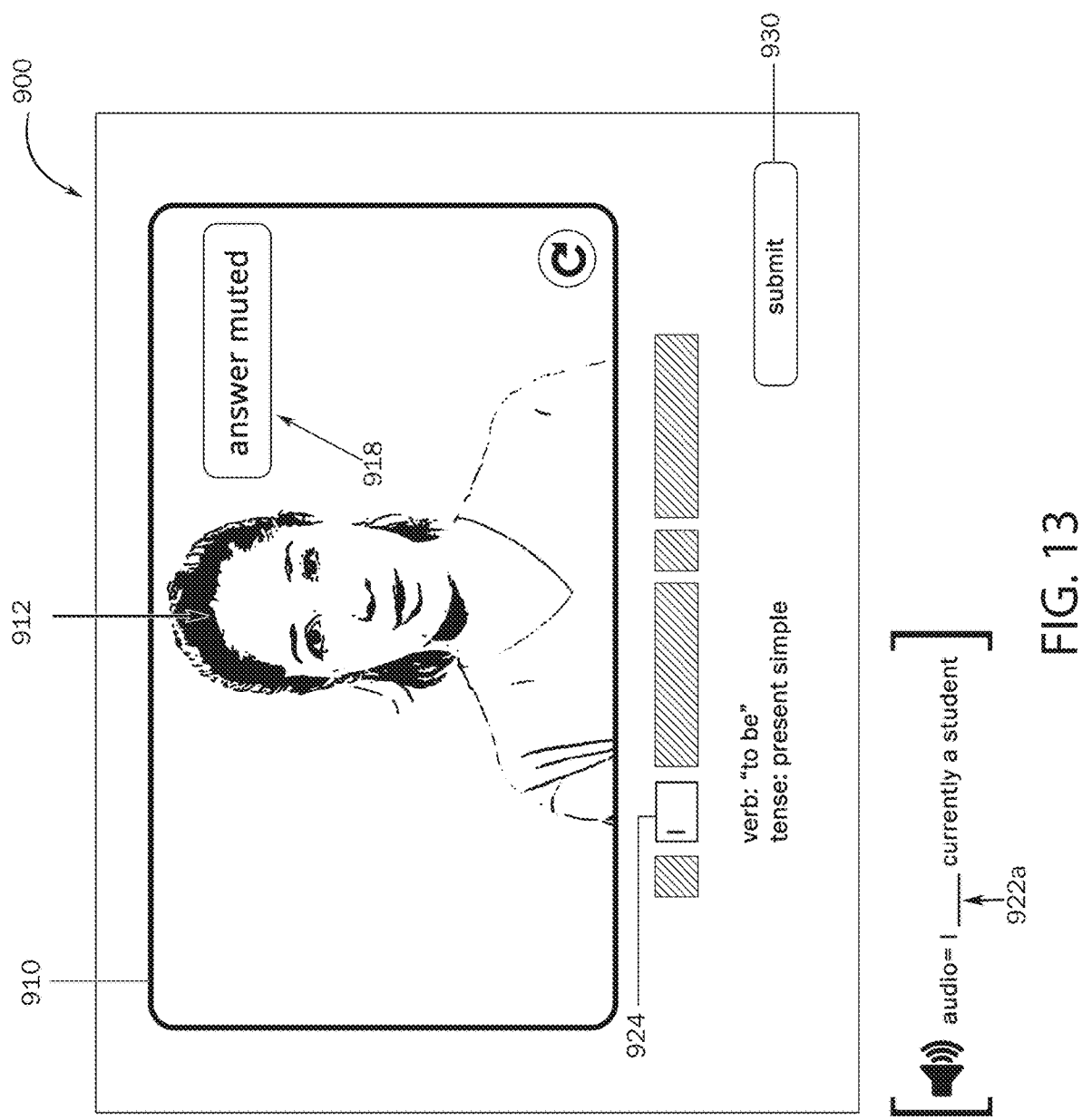
FIG. 13 is a diagram of the aural cloze exercise presentation screen of FIG. 9 having only audio obfuscation, according to an illustrative embodiment of the invention.

FIG. 13 illustrates the cloze exercise presentation screen 900 when video obfuscation has been removed. When the speaker 912 speaks the aural cloze portion 922a, an audio obfuscation indicator 918 indicates that audio of the speaker is being obfuscated. Audio is obfuscated in FIG. 10 as well, when the speaker speaks aural cloze portion. However, in FIG. 13 there is no video obfuscation while the speaker speaks the aural cloze portion. Facial features of the speaker can be seen that may provide the user with hints. Moreover, because the video representation is slowed while the speaker says the aural cloze portion, a slow motion effect created by slowed video playback gives the user an enhanced ability to study the mouth, tongue, and facial motion of speaker, providing for greater clues as to the cloze portion.

Figure 14:
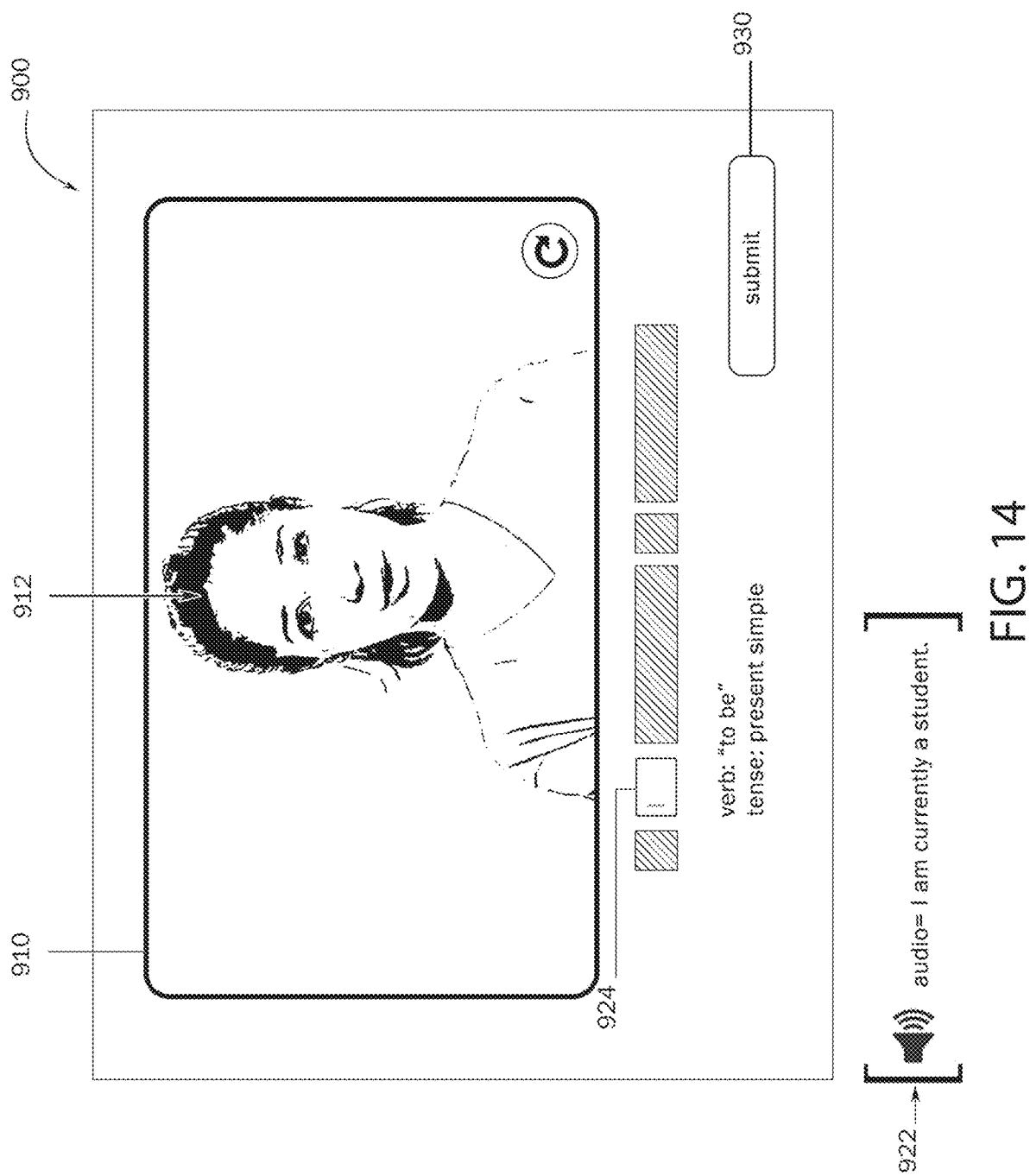
FIG. 14 is a diagram of the aural cloze exercise presentation screen of FIG. 9 having neither audio nor video obfuscation, according to an illustrative embodiment of the invention.

FIG. 14 illustrates the cloze exercise presentation screen 900 when all obfuscation has been removed. Neither the cover 916 (FIG. 10) nor audio obfuscation indicator 918 (FIG. 13) appear when the speaker 912 says the aural cloze portion 922a. All of the video is fully visible and the entire game phrase 922 is audible.

Figure 15:
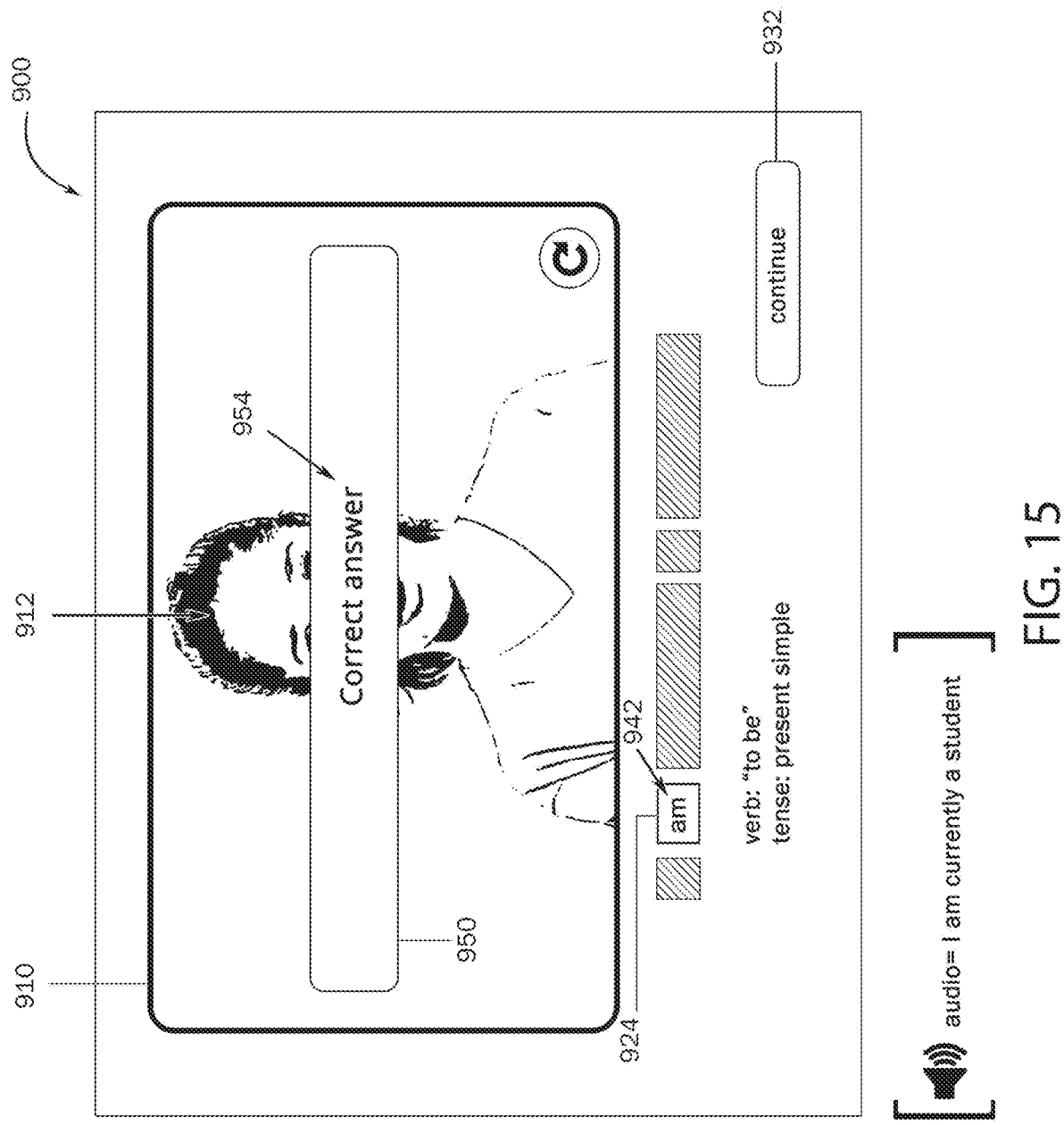
FIG. 15 is a diagram of the aural cloze exercise presentation screen of FIG. 9 displaying feedback of a correct response, according to an illustrative embodiment of the invention.

FIG. 15 illustrates the cloze exercise presentation screen 900 when the response 942 is a correct response. A feedback box 950 appears having a "correct" message 954 informing the user that response is correct. The user may click the continue button 932 to continue to another cloze exercise.

The aural cloze exercise program may keep records of the user's performance. For example, the program may store a number of correct responses and a number of incorrect responses by a user. User performance or progress may be displayed in the form of a numerical and/or graphical score on the GUI. Performance date may be transferred to the web server of FIG. 2.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the claimed invention be limited thereto, as it is intended that the disclosure be broad in scope. Therefore, the above description should not be construed as limiting, but merely as examples of particular embodiments.

Those skilled in the art will envision other modifications within the scope and spirit of the claims appended hereto.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A computer-implemented media player having a non-transitory computer readable memory and at least one computer hardware processor coupled with said memory, said computer-implemented media player comprising:
   a computer-implemented input module configured to receive a package of data related to a recorded spoken word audio passage comprised of:
   a digital data audio segment comprising at least the context portions of a spoken word passage;
   a digital data audio segment comprising at least a designated cloze word from the passage;
   an extended time period duration value for the designated cloze word time-slot; and
   wherein said player's computer processor is configured to execute a computer algorithm or machine based formula that takes into account the original duration of said designated cloze word, an extended time period duration value for the designated cloze word's time-slot, the elongated time effective to improve the average success rate of an aural cloze exercise and said computer processor is further configured to play a version of the spoken word passage with the extended time-slot of the cloze word elongated to the time duration and the cloze word silenced or obfuscated.

2. The computer-implemented media player of claim 1 further comprising:
 also having said computer processor play the combined context portion and cloze word with no obfuscation and/or time elongation.

3. The computer-implemented media player of claim 1 wherein:
 said data package comprises a corresponding video sequence that includes a representation of a mouth speaking the passage in synchrony with the produced audio.

4. The computer-implemented media player of claim 3 wherein:
 the data within said data package is further configured to be played by a computer-implemented media player in a mode where the video is selectively obfuscated by said computer processor during any audio obfuscation.

5. A computer-implemented media player having a non-transitory computer readable memory and at least one computer hardware processor coupled with said memory, said computer-implemented media player comprising:
 a computer-implemented input module configured to receive a package of data related to a recorded spoken word audio passage comprised of:
  a digital data audio segment comprising at least the context portions of a spoken word passage; and
  a digital data audio segment comprising at least a designated cloze word from the passage;
   wherein said player's computer processor is configured to execute a computer algorithm or machine based formula that takes into account the original duration of said designated cloze word to:
   have said computer processor is configured calculate an extended time period value for the designated cloze word's time-slot duration, the elongated time effective to improve the average success rate of an aural cloze exercise; and
   said computer processor is further configured to play a version of the spoken word passage with the time-slot of the cloze word elongated to the extended time duration and the cloze word silenced or obfuscated.

6. The computer-implemented media player of claim 5 further comprising:
 also having said computer processor play the combined context portion and cloze word with no obfuscation and/or time elongation.

7. The computer-implemented media player of claim 5 wherein:
 said data package comprises a corresponding video sequence that includes a representation of a mouth speaking the passage in synchrony with the produced audio.

\* \* \* \* \*